United States Patent
Huang et al.

(10) Patent No.: US 7,903,377 B2
(45) Date of Patent: Mar. 8, 2011

(54) SYSTEM, METHOD, AND APPARATUS FOR AN INDEPENDENT FLEXIBLE CABLE DAMPER FOR REDUCING FLEXIBLE CABLE FATIGUE IN A HARD DISK DRIVE

(75) Inventors: Fu-Ying Huang, San Jose, CA (US); Jr-Yi Shen, Sunnyvale, CA (US); Jifang Tian, St. Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 845 days.

(21) Appl. No.: 11/838,350

(22) Filed: Aug. 14, 2007

(65) Prior Publication Data
US 2009/0046390 A1  Feb. 19, 2009

(51) Int. Cl.
G11B 21/02  (2006.01)
G11B 33/12  (2006.01)

(52) U.S. Cl. .................. 360/264.2; 360/245.9
(58) Field of Classification Search ............... 360/97.01, 360/264.2, 245.9
See application file for complete search history.

(56) References Cited

U.S. PATENT DOCUMENTS

| | | | | |
|---|---|---|---|---|
| 5,278,709 A | * | 1/1994 | Thornton et al. | 360/97.01 |
| 5,325,252 A | * | 6/1994 | Yagi et al. | 360/236.7 |
| 5,615,068 A | * | 3/1997 | Matsuda et al. | 360/264.2 |
| 5,701,220 A | * | 12/1997 | Koriyama | 360/264.2 |
| 5,717,541 A | | 2/1998 | Ycas et al. | |
| 5,745,326 A | | 4/1998 | Koriyama | |
| 5,757,580 A | | 5/1998 | Andress et al. | |
| 5,818,667 A | | 10/1998 | Larson | |
| 5,901,020 A | * | 5/1999 | Koriyama | 360/264.2 |
| 5,907,452 A | | 5/1999 | Kan | |
| 5,940,252 A | | 8/1999 | Patterson | |
| 5,963,399 A | | 10/1999 | Briggs et al. | |
| 7,116,522 B2 | | 10/2006 | Poorman | |
| 7,414,813 B2 | * | 8/2008 | Huynh | 360/264.2 |
| 7,649,718 B1 | * | 1/2010 | Edwards | 360/264.2 |
| 2003/0235012 A1 | | 12/2003 | Nishizawa | |
| 2004/0264058 A1 | * | 12/2004 | Huynh | 360/264.2 |
| 2007/0153426 A1 | * | 7/2007 | Izumi et al. | 360/264.2 |
| 2009/0141404 A1 | * | 6/2009 | Kerner et al. | 360/245.8 |
| 2010/0027165 A1 | * | 2/2010 | Huang et al. | 360/264 |

FOREIGN PATENT DOCUMENTS

JP  05135513 A  *  6/1993

(Continued)

OTHER PUBLICATIONS

J. A. Wickert, Vibration of Flex Circuits in Hard Disk Drives, Journal of Vibration and Acoustics, Jul. 2003, vol. 125 pp. 335-342, ASME, Pittsburg, PA.

(Continued)

Primary Examiner — William J Klimowicz

(57) ABSTRACT

A hard disk drive has a flexible cable and a flexible cable damper positioned adjacent to but separate from the flexible cable. The damper is a thin film loop with a damper patch that is completely independent of the flexible cable. The damper strip is a non-signal carrying substrate and has the constraint layer attached to it opposite the flexible cable. Both the damper and flexible cable extend in an arcuate configuration from the base to an integrated lead suspension tail extending from the actuator.

20 Claims, 3 Drawing Sheets

FOREIGN PATENT DOCUMENTS

| | | | | |
|---|---|---|---|---|
| JP | 07037662 | A | * | 2/1995 |
| JP | 08045204 | A | * | 2/1996 |
| JP | 08287625 | A | * | 11/1996 |
| JP | 09128953 | A | * | 5/1997 |
| JP | 10106182 | A | * | 4/1998 |
| JP | 10134529 | A | * | 5/1998 |
| JP | 2004152448 | A | * | 5/2004 |

OTHER PUBLICATIONS

Jonathan Wickert, Modeling and Free Vibration of Flex Circuits in Hard Disk Drives, Sep. 2003, ASME, Chicago, IL.

M. R. Brake, et al., Optimizing Vibration Isolation of Flex Circuits in Hard Disk Drives, Journal of Vibration and Acoustics, Apr. 2005, vol. 127 pp. 165-172, ASME, Pittsburg, PA.

* cited by examiner

SYSTEM, METHOD, AND APPARATUS FOR AN INDEPENDENT FLEXIBLE CABLE DAMPER FOR REDUCING FLEXIBLE CABLE FATIGUE IN A HARD DISK DRIVE

BACKGROUND OF THE INVENTION

1. Technical Field

The present invention relates in general to flexible cables used in disk drives and, in particular, to an improved system, method, and apparatus for an independent flexible cable damper for reducing flexible cable fatigue in hard disk drives.

2. Description of the Related Art

Magnetic disk drives are information storage devices that utilize at least one rotatable magnetic media disk having concentric data tracks defined for storing data. A magnetic recording head or transducer reads data from and/or writes data to the various data tracks. A slider supports the transducer in proximity to the data tracks typically in a flying mode above the storage media. A suspension assembly resiliently supports the slider and the transducer over the data tracks. A positioning actuator is coupled to the transducer/slider/suspension combination for moving the transducer across the media to the desired data track and maintaining the transducer over the data track center line during a read or a write operation.

The transducer is attached to or is formed integrally with the slider which supports the transducer above the data surface of the storage disk by a cushion of air, referred to as an air-bearing, generated by the rotating disk. Alternatively, the transducer may operate in contact with the surface of the disk. Thus, the suspension provides desired slider loading and dimensional stability between the slider and an actuator arm which couples the transducer/slider/suspension assembly to the actuator.

The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks.

The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks. The term seek refers generally to the radial movement of the heads or transducer to a specified track on the disk.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks. One or more electrical conductors extend over the suspension assembly to electrically connect the read/write transducer to a read/write chip on the actuator arm.

A multiline flexible printed circuit cable (actuator flexible cable) provides the electrical contact between the read/write chip and the disk drive electronics which are mounted outside the disk drive housing. Inside the disk drive housing, the actuator flexible cable connects to an electrical connector pin assembly, which in turn, through an opening or connector port in the housing, connects to the external electronics.

The actuator flexible cable is a flexible circuit that carries electrical signals to and from the actuator. It is typically comprised of a plurality of electrical conductors encapsulated within an insulating material, for example polyimide. The actuator flexible cable provides electrical contact from the external electronics fixed to the disk drive housing to the actuator which is supported on bearings allowing radial motion of the actuator about its pivot point. The radial motion of the actuator allows the read/write transducers supported on suspensions fixed to the actuator to access data tracks on the disk surfaces located at any radial position from the disk ID to the disk OD.

The preferred method of fixing the actuator flexible cable between electronics card on the fixed disk drive housing and the rotatable actuator is to form the actuator flexible cable in a loop so that the actuator flexible cable causes minimal constraint on the actuator rotation. The loop of actuator flexible cable connecting the actuator with the electronics card can vibrate during seeking of the actuator, introducing unwanted vibration modes to the actuator. Flexible cable induced vibration, also known as random transient vibration or RTV, of the actuator during seek operations degrades settling performance of the disk drive.

There have been attempts in the prior art to minimize the affects of the flexible cable on the actuator or head carriage assembly. For example, one solution uses a double-sided pressure sensitive adhesive tape between the flexible cable and the actuator arm to mitigate deformation of the head carriage. Another solution uses a reducing member supporting mechanism and a reducing member sandwiched together at the base plate where the flexible cable attaches to the disk drive housing.

FIG. 1 depicts another conventional solution to overcoming RTV in actuators. A patched damper 11 is attached directly to a surface of a flexible cable 13 near the actuator. Patched dampers are critical but vulnerable components that can break during the actuator's seeking motion due to stress concentrations and fatigue. Thus, although these designs are workable, an improved solution that provides the necessary RTV attenuation but overcomes the limitations of the prior art would be desirable.

SUMMARY OF THE INVENTION

Embodiments of a system, method, and apparatus for an improved flexible cable design in a hard disk drive is disclosed. A flexible cable damper is positioned adjacent to but separate from the flexible cable. The damper may comprise an additional thin film loop with a damper patch that is completely independent of the flexible cable. In one version, the damper strip comprises a non-signal carrying substrate and has a constraint layer attached to it opposite the flexible cable. Both the damper and flexible cable extend from a base mounting structure to an integrated lead suspension tail extending from the actuator, and may be configured in complementary arcuate shapes. However, the damper does not make physical contact with the flexible cable. The damper provides equivalent or improved damping compared to conventional designs but without accelerating fatigue of the flexible cable.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 4:
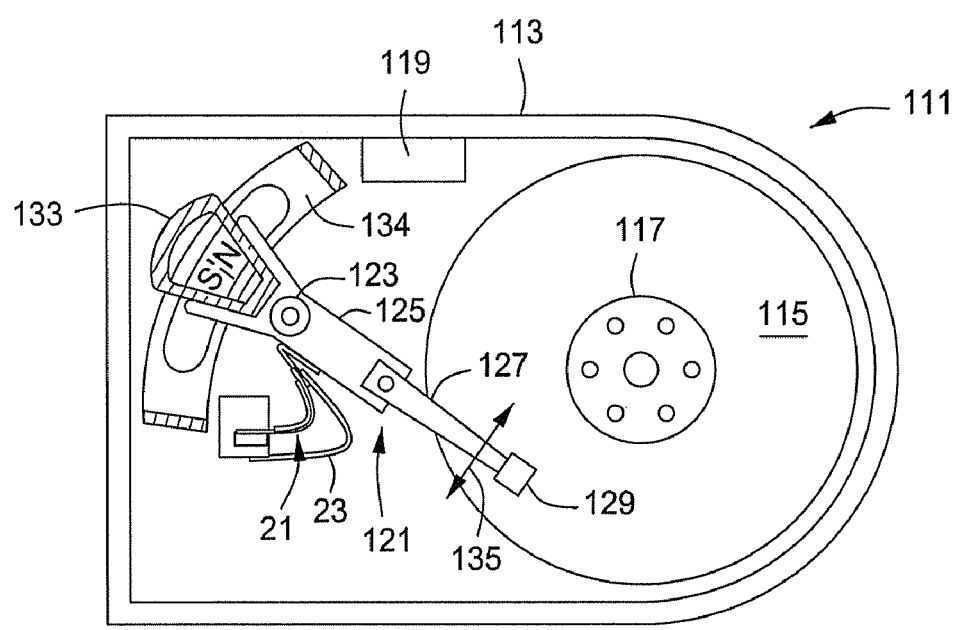
FIG. 4 is a schematic diagram of one embodiment of a disk drive constructed, in accordance with the invention.

Referring now to FIG. 4, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

Figure 2:
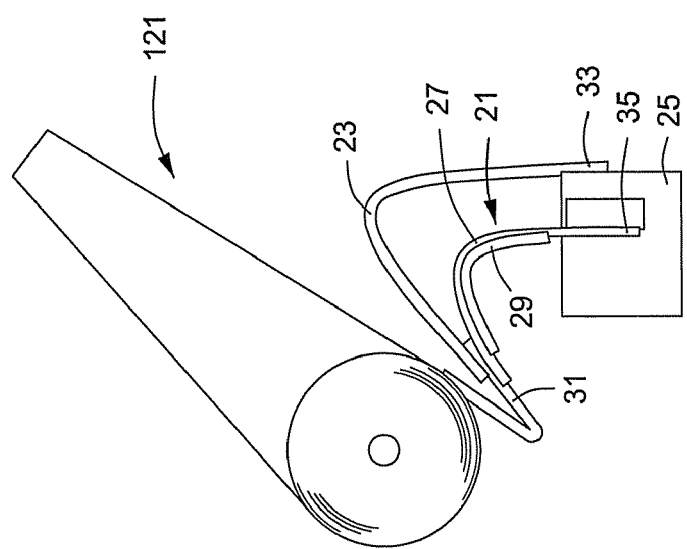
FIG. 2 is a schematic top view of one embodiment of a flexible cable damper constructed in accordance with the invention.
Figure 1:
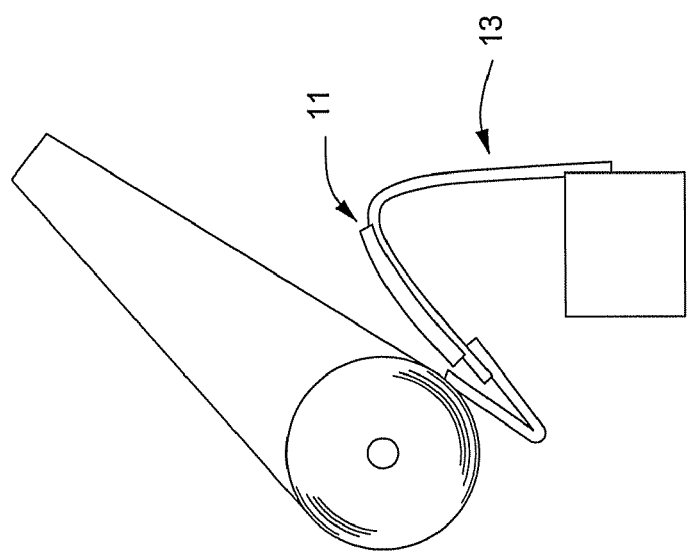
FIG. 1 is a schematic top view of a conventional flexible cable damper for a hard disk drive.

Referring now to FIG. 2, one embodiment of a flexible cable damper 21 constructed in accordance with the invention is shown. The flexible cable damper 21 is located adjacent to a flexible cable 23 that extends from the base 113 (e.g., a mounting block 25 coupled to base to the actuator 121 for carrying signals from the controller 119 to the head 129. The damper 21 is completely independent of and spaced apart from the flexible cable 23 such that they do not make physical contact with each other. The damper 21 reduces random transient vibration (RTV) of the flexible cable 23 during operation of the actuator 121. In one embodiment, the damper 21 also extends from the base 113 (e.g., mounting block 25) to the actuator 121 and has no conductors for carrying signals of any type (e.g., communication, power, etc.).

The damper 21 may comprise a thin film loop 27 having a damper patch 29 affixed thereto. The thin-film loop 27 comprises a non-signal carrying substrate and the damper patch 29 may comprise a constraint layer that is attached opposite the flexible cable 23 as shown. In the illustrated embodiment, both the flexible cable 23 and the damper 21 are attached to the actuator 121 via an integrated lead suspension tail 31 that extends from the actuator 121. In one version, the flexible cable 23 and the damper 21 are attached to opposite sides of the integrated lead suspension tail 31, and are attached to the mounting block 25 such that base ends 33, 35 of the flexible cable 23 and damper 21, respectively, are axially spaced apart from each other. In addition, the constraint layer 29 is free of contact with the tail 31 as shown.

In addition, both the flexible cable 23 and the damper 21 may be configured in complementary arcuate shapes, with the flexible cable having a longer length and greater radial dimension than the damper 21. On the damper 21 itself, the loop 27 has a longer length and greater radial dimension than the constraint layer 29. In one embodiment, the constraint layer 29 is positioned at a midpoint or axially symmetric about the apex of the loop 27.

Figure 3:
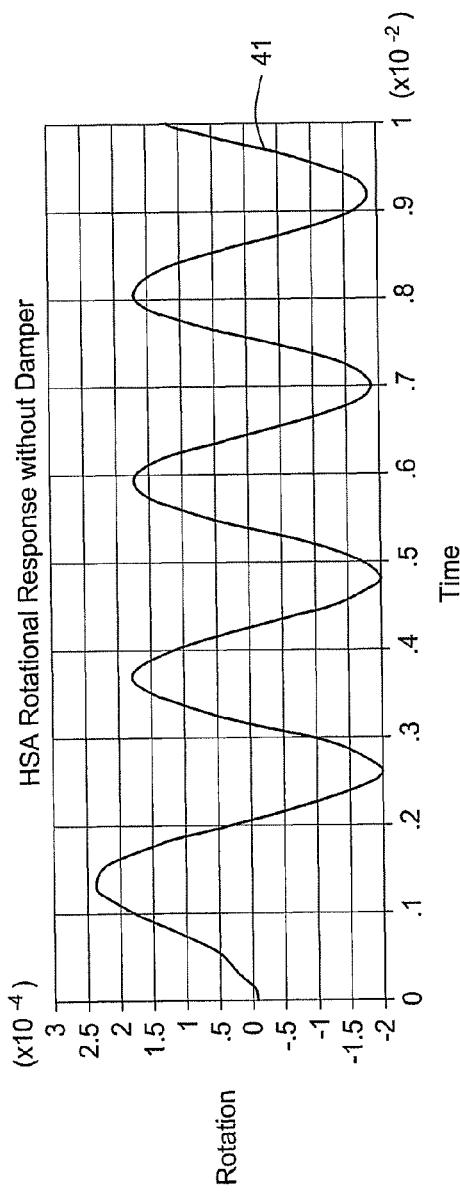
FIG. 3 depicts plots of performance comparing an undampened flexible cable to the design of FIG. 2.
Figure 3:
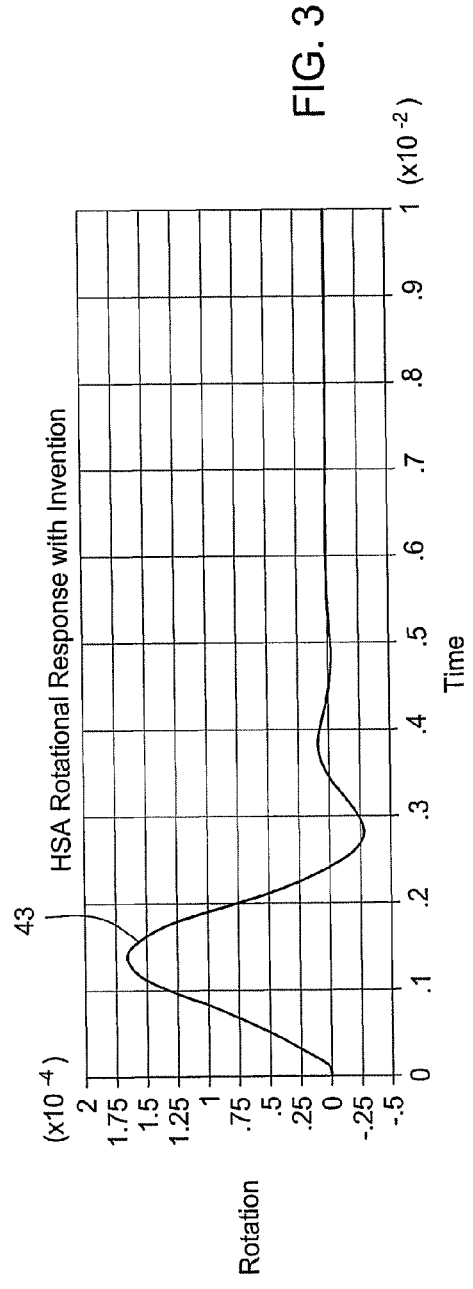

Referring now to FIG. 3, plots of performance comparing actuators having an undampened flexible cable (upper plot 41) to the design of FIG. 2 (lower plot 43) are shown. The plot 41 for an undampened flexible cable depicts a response having a high amplitude (e.g., approximately +2.5 and −2) and a long period of time for stabilization. In contrast, the plot 43 for the invention depicts a much lower amplitude (e.g., approximately +1.7 and −0.25) and a more stabilization.

While the invention has been shown or described in only some of its forms, it should be apparent to those skilled in the art that it is not so limited, but is susceptible to various changes without departing from the scope of the invention.

What is claimed is:

1. A disk drive, comprising:
   a base;
   a disk rotatably mounted to the base and having media for storing data;
   an actuator movably mounted to the base adjacent the disk, the actuator having a head for reading data from the disk;
   a controller for controlling operations of the disk and the actuator;
   a flexible cable extending from the base to the actuator for carrying signals from the controller to the head;
   a damper mounted adjacent to and free of contact with the flexible cable for providing reducing random transient vibration of the flexible cable during operation of the actuator, the damper also extending from the base to the actuator and having no conductors; and
   both the flexible cable and the damper are attached to the actuator via an integrated lead suspension tail extending from the actuator, the damper comprises a substrate and a constraint layer, and the constraint layer is free of contact with the integrated lead suspension tail.

2. A disk drive according to claim 1, wherein the damper comprises a thin film loop having a damper patch affixed thereto.

3. A disk drive according to claim 1, wherein the damper comprises a non-signal carrying substrate and has the constraint layer attached to it opposite the flexible cable.

4. A disk drive according to claim 3, wherein the non-signal carrying substrate has a longer length and greater radial dimension than the constraint layer.

5. A disk drive according to claim 3, wherein the constraint layer is symmetrically positioned on the non-signal carrying substrate at a midpoint thereof about an apex of the non-signal carrying substrate.

6. A disk drive according to claim 1, wherein the flexible cable and the damper are attached to opposite sides of the integrated lead suspension tail, and are attached to the base via a mounting block such that base ends of the flexible cable and damper are axially spaced apart from each other.

7. A disk drive according to claim 1, wherein both the flexible cable and the damper are configured in complementary arcuate shapes.

8. A disk drive according to claim 7, wherein the flexible cable has a longer length and greater radial dimension than the damper.

9. A disk drive, comprising:
a base;
a disk rotatably mounted to the base and having media for storing data;
an actuator movably mounted to the base adjacent the disk, the actuator having a head for reading data from the disk;
a controller for controlling operations of the disk and the actuator;
a flexible cable extending from the base to the actuator for carrying signals from the controller to the head; and
a damper mounted adjacent to and free of contact with the flexible cable for providing reducing random transient vibration of the flexible cable during operation of the actuator, the damper also extending from the base to the actuator and having no conductors, and the damper comprising a non-signal carrying substrate having a constraint layer attached thereto opposite the flexible cable.

10. A disk drive according to claim 9, wherein the non-signal carrying substrate has a longer length and greater radial dimension than the constraint layer.

11. A disk drive according to claim 10, wherein the constraint layer is symmetrically positioned on the non-signal carrying substrate at a midpoint thereof about an apex of the non-signal carrying substrate.

12. A disk drive according to claim 9, wherein both the flexible cable and the damper are attached to the actuator via an integrated lead suspension tail extending from the actuator.

13. A disk drive according to claim 12, wherein the flexible cable and the damper are attached to opposite sides of the integrated lead suspension tail, and are attached to the base via a mounting block such that base ends of the flexible cable and damper are axially spaced apart from each other.

14. A disk drive according to claim 12, wherein the constraint layer is free of contact with the integrated lead suspension tail.

15. A disk drive according to claim 9, wherein both the flexible cable and the damper are configured in complementary arcuate shapes.

16. A disk drive according to claim 15, wherein the flexible cable has a longer length and greater radial dimension than the damper.

17. A disk drive, comprising:
a base;
a disk rotatably mounted to the base and having media for storing data;
an actuator movably mounted to the base adjacent the disk, the actuator having a head for reading data from the disk;
a controller for controlling operations of the disk and the actuator;
a flexible cable extending from the base to the actuator for carrying signals from the controller to the head;
a damper mounted adjacent to and free of contact with the flexible cable for providing reducing random transient vibration of the flexible cable during operation of the actuator, the damper also extending from the base to the actuator and having no conductors; and
the flexible cable has a longer length and greater radial dimension than the damper.

18. A disk drive according to claim 17, wherein the damper comprises a thin film loop having a damper patch affixed thereto.

19. A disk drive according to claim 17, wherein the flexible cable and the damper are attached to opposite sides of an integrated lead suspension tail, and are attached to the base via a mounting block such that base ends of the flexible cable and damper are axially spaced apart from each other.

20. A disk drive according to claim 17, wherein both the flexible cable and the damper are configured in complementary arcuate shapes.

* * * * *